United States Patent Office 3,518,113
Patented June 30, 1970

3,518,113
POLYURETHANE LATICES AS PAPER-MAKING ADDITIVES
Ian C. MacGugan, Trenton, Mich., assignor to Wyandotte Chemicals Corporation, Wyandotte, Mich., a corporation of Michigan
No Drawing. Filed Dec. 5, 1966, Ser. No. 598,886
Int. Cl. B32b *29/00;* D21h *1/28, 3/60*
U.S. Cl. 117—155                                5 Claims

ABSTRACT OF THE DISCLOSURE

Paper is treated with a polyurethane latex to upgrade its physical properties, particularly its fold strength. The polyurethane latices used are prepared by chain extending, in the presence of water, an isocyanate-terminated prepolymer obtained by the reaction of an organic compound having at least two active hydrogen atoms with a stoichiometric excess of an organic polyisocyanate.

---

The present invention relates to a method of treating paper to improve the physical properties thereof and to the paper produced thereby. More particularly, the invention relates to the use of certain polyurethane latex compositions as additives for the paper-making system.

The use of latices as impregnants for specialty paper is well known in the art. Illustrative of the many latices which are used to treat paper are butadiene-styrene latices, acrylonitrile latices, acrylic latices, and isocyanate latices. The particular latex used will depend upon the end use of the treated paper since each latex provides increases in one or more of the physical properties of paper.

Recently paper has been used in many new applications including gaskets, diaphragms, and men and women's apparel, particularly dresses and shoes. To be useful in these applications, paper must be highly resistant to ripping or splitting upon folding and bending. In the paper field, this property of paper is known as its fold strength.

Accordingly, it is an object of the present invention to provide a paper possessing exceptional fold strength properties. It is a further object of the present invention to provide a method of treating paper to improve the general physical properties of the paper. Another object of the present invention is to provide polyurethane latices for application in the paper system. These and other objects of the present invention will be apparent from the specifications and examples which follow.

The above objects are accomplished in accordance with the present invention by treating paper with certain polyurethane latices. The polyurethane latices which are employed in the present invention are prepared from three essential reactants, an organic compound having at least two active hydrogen atoms, an organic polyisocyanate, and a chain extending agent. The latices are generally prepared, as more fully discussed hereinafter, by chain extending in the presence of water an isocyanate-terminated prepolymer obtained from the reaction of an organic compound having at least two active hydrogen atoms with a stoichiometric excess of an organic polyisocyanate.

The paper product of the present invention comprises paper and particles of polyurethane polymer dispersed therein or intermingled therewith, the particles having been separated from a polyurethane latex after contact with the paper. The paper product will generally comprise, based on 100 parts by weight of paper, from about 10 parts to about 200 parts, preferably from 30 parts to 150 parts, of dry solid polyurethane polymer. Latices comprising from about 20% to 75% by weight solids content polyurethane polymer are generally employed to impregnate the paper.

Various types of paper may be treated in accordance with the present invention. These include paper manufactured from rope, rags, cotton, sulfite, and high alphacellulose content pulp. Typical paper includes kraft liner stock, kraft board, kraft saturating stock, blended kraft pulp, and bleached kraft pulp.

The paper may be treated with the polyurethane latex by any suitable method. It is generally preferred to utilize the beater impregnation, the wet web impregnation, or the dry web impregnation method. In the beater impregnation method, the latex is added to the paper-making slurry in the beater and the paper is then formed from this slurry. In the wet web impregnation method, excess water is removed from the paper web which is then passed through a bath of the latex. In the dry web impregnation method, the paper web is dried before being passed through a bath of the latex. After the paper is treated by any of the above methods, it is then cured by heating. Temperatures between 130° C. and 150° C. are generally necessary to effect the cure. Heating time will vary with the particular paper treated, the latex employed, and the temperature of the cure. Generally, from 10 to 20 minutes will be sufficient.

If desired, any of the well-known paper additives may be added to the latices of the present invention prior to their use in accordance with the present invention. These additives include pigments such as calcium carbonate, magnesium or calcium silicate, and titanium dioxide; thickening agents such as ammonium salts of polyacrylic acids and stabilizers such as the tetrasodium salt of ethylene diamine tetraacetic acid. It is also possible to employ the latices of the present invention along with known latices for the paper system such as acrylic latices, acrylonitrile latices, polyvinyl acetate latices, and butadienestyrene latices.

As mentioned above, the polyurethane latices which are employed in the present invention are prepared from three essential reactants, namely, an organic polyisocyanate, an organic compound having at least two active hydrogen atoms, and a chain extending agent. Organic polyisocyanates which may be employed include aromatic, aliphatic and cycloaliphatic polyisocyanates and combinations thereof. Representatives of these types are the diisocyanates such as m-phenylene diisocyanate, tolylene-2,4-diisocyanate, tolylene - 2,6 - diisocyanate, mixtures of 2,4- and 2,6 - hexamethylene - 1,6 - diisocyanate, tetramethylene - 1,4 - diisocyanate, cyclohexane - 1,4 - diisocyanate, hexahydrotolylene diisocyanate (and isomers), naphthylene - 1,5 - diisocyanate, 1 - methoxyphenyl - 2,4 - diisocyanate, diphenylmethane - 4,4' - diisocyanate, 4,4'-biphenylene diisocyanate, 3,3' - dimethoxy - 4,4' - biphenyl diisocyanate, 3,3' - dimethyl - 4,4' - biphenyl diisocyanate, and 3,3' - dimethyl - diphenylmethane - 4,4'-diisocyanate; the triisocyanates such as 4,4',4" - triphenylmethane triisocyanate, polymethylene polyphenylisocyanate and tolylene 2,4,6-triisocyanate; and the tetraisocyanates such as 4,4' - dimethyldiphenylmethane - 2,2',5,5' - tetraisocyanate. Especially useful due to their availability and properties are tolylene diisocyanate, diphenylmethane - 4,4' - diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

Any organic compound having at least two active hydrogen atoms may be employed in the preparation of the polyurethane latices. The term "active hydrogen atoms" refers to hydrogen atoms which, because of their position in the molecule, display activity according to the Zerewitinoff test as described by Kohler in J. of Am. Chem. Soc., 49, 3181 (1927).

The active hydrogen atoms are usually attached to oxygen, nitrogen or sulphur atoms. Thus, suitable active hydrogen-containing groups as determined by the Zerewitinoff method which are reactive with an isocyanate group include —OH, —NH—, —COOH and —SH. Examples of suitable types of organic compounds containing at least two active hydrogen-containing groups which are reactive with an isocyanate group are hydroxyl-containing polyesters, polyalkylene polyether polyols, hydroxy-terminated polyurethane polymers, polyhydric polythioethers, alkylene oxide adducts of acids of phosphorus, polyacetals, aliphatic polyols, aliphatic thiols including alkane, alkene and alkyne thiols having two or more —SH groups; diamines including both aromatic, aliphatic and heterocyclic diamines, as well as mixtures thereof. Compounds which contain two or more different groups within the above-defined classes may also be used such as, for example, amino alcohols which contain an amino group and a hydroxyl group. Also compounds may be used which contain one —SH group and one —OH group as well as those which contain an amino group and a —SH group.

Any suitable hydroxyl-containing polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol and sorbitol. Also included within the term "polyhydric alcohol" are compounds derived from phenol such as 2,2-(4,4'-hydroxyphenol)propane, commonly known as Bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, propylene glycol and 2,2-(4,4'-hydroxyphenyl)-propane and blends thereof having equivalent weights of from 250 to 5000.

Any suitable polyhydric polythioether may be used such as, for example, the condensation product of thiodiglycol or the reaction product of a dihydric alcohol such as is disclosed above for the preparation of the hydroxy-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Any suitable polyamine may be used including aromatic polyamines such as p-amino aniline, 1,5-secondary diamino naphthalene and 2,4-secondary diamino toluylene; aliphatic polyamines such as N,N'-secondary ethylene diamine, N,N'-secondary 1,3-propylene diamine, N,N'-secondary 1,4-butylene diamine, and N,N'-secondary 1,3-butylene diamine. Alkylene oxide adducts of any of the above polyamines may also be used, particularly propylene oxide adducts of p-amino aniline and ethylene diamine.

Other compounds which do not necessarily fit within any of the previously set forth classes of compounds which are quite suitable in the production of isocyanate-terminated prepolymers include the hydroxy-terminated polyurethane prepolymers such as a hydroxy-terminated prepolymer made by reacting an isocyanate with several moles of an alkylene glycol.

The isocyanate-terminated prepolymers are ordinarily prepared by heating the organic polyisocyanate and the organic compound containing at least two active hydrogen atoms with agitation at a temperature of from about 60° C. to about 110° C., preferably from about 70° C. to about 90° C. A catalyst may be empolyed in this reaction if desired. If a catalyst is employed, temperatures below 60° C. may be used. The reactants are heated for a period sufficient to react all the hydroxyl groups, whereafter the prepolymer is allowed to stand and the free NCO content determined. Generally, total reaction time will be from about two hours to about four hours. However, if a catalyst is employed, a period of from about fifteen minutes to about one hour is sufficient.

The reaction is preferably carried out, but not necessarily, in the presence of a solvent. If the prepolymer is a fluid at processing temperatures, it is possible to carry out the reaction in the absence of a solvent. Convenient solvents are organic solvents having a boiling range above 90° C. when the reaction is to be carried out in open equipment. Lower boiling solvent may, of course, be used where the reaction is carried out in closed equipment to prevent boiling off the solvent at the temperatures of the reaction. The solvent, when used, may be added at the beginning, at an intermediate point, or at the end of the prepolymer stage, or after cooling of the formed prepolymer. The solvents to be used are preferably those in which the reactants are soluble. Ketones and esters may be used. The aliphatic hydrocarbon solvents such as the heptanes, octanes and nonanes, or mixtures of such hydrocarbons obtained from naturally occurring petroleum sources such as kerosene, or from synthetically prepared hydrocarbons, may sometimes be employed. Cycloaliphatic hydrocarbons such as methylcyclohexane and aromatic hydrocarbons such as toluene may likewise be used. Hydrocarbon solvents such as toluene and benzene are preferred. The amount of solvent used may be varied widely. From 25 parts to 400 parts of solvent per 100 parts of active hydrogen-containing compound have been found to be operable. The excess solvent, where large amounts are employed, may be separated partially or completely from the polymer prior to emulsification in the water solution; sometimes the excess solvent is useful and is allowed to remain during the emulsification stage.

The amounts of organic polyisocyanate and organic compound having at least 2 active hydrogen atoms which are employed in the preparation of the prepolymers are such that the NCO OH equivalent ratio is between 1.3:1 to 3:1, preferably 1.5:1 to 2:1. At ratios greater than 3:1, incompatible resins tend to form, while at ratios less than 1.3:1, gelling of the polymer tends to occur.

After the prepolymer is prepared, it is emulsified by combining it with an aqueous solution of a surfactant with vigorous agitation. Emulsification of the prepolymer may occur by adding an aqueous solution of a surfactant to the prepolymer, by adding the prepolymer to an aqueous solution of a surfactant, by initially adding a surfactant to the prepolymer reactants and then adding water after the prepolymer has been prepared or by adding a surfactant to an aqueous medium containing the prepolymer.

The amount of water to be employed in the formation of the emulsion is not critical. When too small an amount of water is employed, emulsions are obtained which are too thick to handle readily while, on the other hand, dispersions which are too dilute are uneconomical to handle due to their excessive volume.

Any emulsifying agent which will give oil-in-water emulsions is satisfactory for use in the present invention. Satisfactory types of emulsifying agents are the polyethylene glycol ethers of long chain alcohols, quaternary ammonium salts, the tertiary amine or alkylol amine salts of long chain alkyl acid sulphate esters, alkyl sulphonic acids or alkyl aryl sulphonic acids or salts thereof; and alkali metal salts of high molecular weight organic acids. Nonionic agents such as polyoxyethylene-polyoxypropylene glycols are preferred. The pH can then be regulated to a neutral value, preferably not above seven, to mimimize any tendency toward hydrolysis. Salts of the high molecular weight organic acids may be used as emulsifying agents, One method of incorporating such salts is to mix the acid, e.g. coconut oil, with the prepolymer mass and to have the requisite amount of alkali present in the aqueous bath, so as to form the emulsifier in situ. Although there is presumably some reaction between the acid and the free isocyanate groups in the prepolymer, this is not significant if the mixture is fairly promptly added to the aqueous bath. From 0.5 percent to 6 percent of the emulsifying agent, based on the weight of the prepolymer employed, will usually be found sufficient to produce stable emulsions. When a fatty acid soap is used as the emulsifying agent, the soap must not be destroyed by acidic substances. The pH must, therefore, be maintained at least as high as that of an aqueous solution of the soap if stable latices are to be produced. For most fatty acid soaps, the pH should be at least nine, and for this reason soaps are not preferred. The small amount of carbon dioxide which may be formed by the chain extension of the isocyanate groups with water is acidic and uses up free alkali in the latex, so that an excess of alkali may be necessary to compensate for this. Preferably no alkali is added to the reaction, since some usually remains and causes deterioration of the polymer at elevated temperatures.

Chain extensions of the prepolymers occurs by adding a chain extending agent to the emulsified prepolymer. The chain extending agent is preferably added in the form of an aqueous solution or dispersion thereof. However, it may be added alone or in the form of a solvent solution thereof.

The chain extending agents which may be employed in the preparation of the latices of this invention are those compounds having at least two functional groups bearing active hydrogen atoms such as water, hydrazine, primary and secondary diamines, amino alcohols, amino acids, hydroxy acids, glycols, or mixtures thereof. A preferred group of chain extending agents includes water and primary and secondary diamines which react more readily with the prepolymer than does water such as phenylene diamine 1,4-cyclohexane - bis - (methylamine), ethylene diamine, diethylene triamine, N-(2-hydroxypropyl)ethylene diamine, N,N'-di(2-hydroxypropyl)-ethylene diamine piperazine, 2-methylpiperazine, and dodecahydro - 1,4,7, 9b-tetraazaphalene.

The amount of chain extending agent which is employed in the preparation of the latices of this invention is preferably about 1.0 equivalent of chain extending agent for each isocyanate equivalent. Up to about 1.3 equivalents may be employed. The chain extension step may frequently be assisted by agitation of the emulsion for some time after its initial formation. This is usually accomplished by means of a convenional paddle-type agitator at 30 r.p.m. to 90 r.p.m. or other conventional stirring equipment such as a Cowles Dissolver which aids in contacting the emulsion droplets with the chain extender.

The following examples serve to illustrate the invention. All parts are by weight unless otherwise specified. In the examples, tests were carried out in accordance with standard TAPPI procedures. The TAPPI procedures used were.

Burst strength—T403ts–63    MIT fold—T423M–50
Tensile, dry—T404os–61       Tear strength—T414ts–64
Tensile, wet—T456m–49        Abrasion—T476m–51

EXAMPLE I

Several polyurethane latices were prepared by charging a polyoxyalkylene polyether polyol or a blend of said polyols to a reaction vessel with toluene and tolylene diisocyanate (80/20 mixture of 2,4–2,6 isomers). The charge was stirred for about three hours at 80° C. to 90° C. and after cooling, the unreacted isocyanate content of the resulting prepolymer was determined. A surface active agent dissolved in water was then added to the cooled prepolymer and the emulsion which followed was vigorously agitated while a chain extending agent dissolved in cold water was added to the emulsion. Further details of the preparations may be found in Table I which follows.

TABLE I

| Latex | Polyoxyalkylene polyether polyol | Average equivalent weight | Parts | Parts TDI | NCO/OH Ratio | Surfactant | Parts | Chain extender | Parts |
|---|---|---|---|---|---|---|---|---|---|
| A | 1<br>2 | 275 | 59.2 | 32.8 | 1.75/1 | a | 4 | 2-methylpiperazine | 8.0 |
| B | 1<br>2 | 275 | 59.2 | 32.8 | 1.75/1 | a | 4 | N-(2-hydropropyl) ethylene diamine | 8.0 |
| C | 1<br>3 | 600 | 72.8 | 21.1 | 2/1 | b | 3<br>3 | 2-methylpiperazine | 6.1 |
| D | 1<br>2 | 337.5 | 68.5 | 26.5 | 1.5/1 | a<br>b | 3<br>3 | ___do___ | 5 |
| E | 4<br>5 | 1,111.4 | 83.2 | 13.0 | 2/1 | d | 5 | ___do___ | 3.8 |
| F | 4<br>5 | 1,111.4 | 83.2 | 13.0 | 2/1 | a | 5 | ___do___ | 3.8 |
| G | 4 | 2,143.3 | 90.5 | 7.4 | 2/1 | a | 5 | ___do___ | 2.1 |
| H | 4 | 2,143.3 | 90.5 | 7.4 | 2/1 | a | 5 | ___do___ | 2.1 |
| I | 5<br>6 | 605 | 72.8 | 21.1 | 2/1 | d | 5 | 2-methylpiperazine<br>Morpholine | 4.8<br>1.2 |
| J | 5<br>6 | 605 | 72.8 | 21.1 | 2/1 | a | 5 | 2-methylpiperazine<br>Morpholine | 4.8<br>1.2 |

1. 400 molecular weight polypropylene glycol.
2. 700 molecular weight polypropylene glycol.
3. 1,300 molecular weight polypropylene glycol.
4. 6,430 molecular weight polyol prepared by capping with ethylene oxide, a propylene oxide adduct of trimethylpropane (5% ethylene oxide based on total weight).
5. 666 molecular weight polyol based on Bisphenol A and propylene oxide.
6. 3,000 molecular weight polyol based on propylene oxide and glycerine.
TDI—80/20 mixture of 2,4-2,6-tolylene diisocyanate.
a—Dihydric polyoxyethylene polyoxyproplene having a molecular weight of 16,250, a polyoxyethylene content of about 80% by weight and a polyoxypropylene base molecular weight of about 3,250.
b—Nonylphenoxy polyoxyethylene ethanol.
c—Stearamidopropyldimethyl-B-hydroethyl ammonium dihydrogenphosphate.
d—Sodium laurylsulfate.

EXAMPLE II

This example illustrates the wet web impregnation of paper with polyurethane latices. The paper was filter paper having a basis weight of 54 lbs. per ream of 500 sheets, 24 inches by 36 inches in size. The paper was soaked in water and then dried to 40% O.D. consistency. Each sample was then immersed for about thirty seconds in a latex bath and impregnated to a level of 65 parts by weight of solids (dry) per 100 parts by weight of paper. The impregnated paper was then air dried and cured for ten minutes at 150° C. The samples were then tested in accordance with TAPPI standards. Results of these tests are presented in Table II. From the results presented, it is clear that the physical properties of paper are substantially upgraded by the treatment of the paper with polyurethane latices. Substantial increases are obtained in all properties, particularly in MIT fold strength.

TABLE II

| Latex [1] | Parts by wt. of dry solids per 100 parts of paper | Burst factor | Tensile breaking length in meters, dry | Tensile breaking length in meters, wet | MIT fold, No. of cycles |
|---|---|---|---|---|---|
| Control | 0 | 6.7 | 1,630 | 0 | 5 |
| A | 65 | 36.5 | 3,360 | 1,157 | 482 |
| B | 65 | 30.6 | 2,836 | 330 | 358 |
| C | 65 | 31.2 | 2,587 | 935 | 3,980 |
| D | 65 | 33.1 | 2,849 | 1,082 | 2,693 |

[1] The letters refer to the latices prepared in Example I.

EXAMPLE III

This example illustrates the impregnation of paper with polyurethane latices by beater addition. The paper used was bleached kraft pulp which was beaten to 400 C.S.F. in a Valley beater. The pulp was diluted to 1.0% O.D. consistency for latex addition. Following latex addition, the pulp was agitated for ten minutes and the pH of the system was adjusted to pH 4.0 with alum. The pulp was then allowed to circulate for five minutes and hand sheets were prepared in a standard British sheet machine at 3.0 grams O.D. pulp per sheet. The sheets were then pressed and dried and cured for ten minutes at 150° C. Prior to testing, the sheets were stored at 72° F. at 50% relative humidity for 24 hours. The results of the tests are presented in Table III. As indicated in Table III, all sheets show increases in their physical properties, with substantial gains being demonstrated in MIT fold strength.

TABLE III

| Latex [1] | Parts by weight dry solids per 100 parts of paper | Mullen burst, p.s.i. | Tensile, lbs./in. | Elmendorf tear, gms. | MIT fold, No. of cycles |
|---|---|---|---|---|---|
| Control | 0 | 151 | 64 | 94 | 1,503 |
| A | 30 | 198 | 71 | 108 | 3,302 |
| C | 30 | 163 | 64 | 117 | 2,878 |
| D | 30 | 183 | 77 | 110 | 4,330 |
| F | 30 | 136 | 54 | 124 | 2,392 |
| H | 30 | 120 | 56 | 124 | 2,496 |

[1] See footnote to Table II.

EXAMPLE IV

This example illustrates the dry web impregnation of paper with polyurethane latices. The paper used was bleached kraft pulp which had been made into handsheets on the Standard TAPPI British sheet machine. Each sheet was 4 grams in weight. After drying, each sheet was impregnated for ten minutes with a polyurethane latex which had been diluted with water to 25% solids content. The sheets were then cured for 15 minutes at about 150° C. The sheets were then tested in accordance with TAPPI standards. Results of the tests appear in Table IV. As indicated in Table IV, all sheets show marked improvements in all properties with the exception of tear strength. Substantial gains are recorded in tensile strength, abrasion resistance, and MIT fold strength.

TABLE IV

| Latex [1] | Parts by wt. dry solids per 100 parts of paper | Mullen burst factor | Tear factor | Tensile strength, lbs./in. | MIT fold, No. of cycles | Percent abrasion loss, 1,000 cycles |
|---|---|---|---|---|---|---|
| Control | | 14.4 | 144.1 | 22.2 | 11 | [2] 0 |
| D | 100 | 37.0 | 106.1 | 84.0 | 3071 | 1.8 |
| E | 150 | 24.2 | 118.5 | 65.6 | 3247 | 3.9 |
| G | 150 | 21.5 | 102.2 | 45.0 | 9915 | 6.2 |
| I | 150 | 26.8 | 89.3 | 62.0 | 2618 | 1.5 |
| J | 150 | 26.8 | 89.3 | 62.0 | 2618 | 1.5 |

[1] See footnote to Table II.  [2] Sample failed at 100 cycles.

What is claimed is:

1. Paper impregnated with a polyurethane polymer in amounts such that the impregnated paper consists essentially of, based on 100 parts by weight of paper, from 10 parts to 200 parts of dry solid polyurethane polymer said polyurethane polymer prepared by chain extending with 2-methylpiperazine in the presence of water an isocyanate-terminated prepolymer obtained by the reaction in an NCO/OH equivalent ratio of from 1.3:1 to 3:1 of an organic compound having at least two active hydrogen atoms with an organic polyisocyanate.

2. The paper of claim 1 wherein the organic polyisocyanate is tolylene diisocyanate.

3. The paper of claim 1 wherein the organic compound containing at least two active hydrogen atoms is a polyalkylene polyether polyol.

4. The paper of claim 1 wherein the organic compound containing at least two active hydrogen atoms is a condensation product of an alkylene oxide with a polyhydric alcohol.

5. The paper of claim 1 wherein the organic compound containing at least two active hydrogen atoms is polypropylene glycol.

References Cited

UNITED STATES PATENTS

| Patent | Date | Name | Class |
|---|---|---|---|
| 3,061,475 | 10/1962 | Wallace | 117—155 |
| 3,178,310 | 4/1965 | Berger et al. | 117—155 X |
| 3,213,049 | 10/1965 | Heiss | 117—155 X |
| 3,215,652 | 11/1965 | Kaplan | 260—75 X |
| 3,310,533 | 3/1967 | McElroy | 117—155 X |
| 3,346,445 | 10/1967 | Gay | 162—164 X |
| 3,372,085 | 3/1968 | Westfall et al. | 162—164 |
| 3,373,128 | 3/1968 | Wooster | 117—155 X |
| 3,385,829 | 5/1968 | Heydkamp et al. | 117—155 X |
| 3,401,133 | 9/1968 | Grace et al. | 117—155 X |
| 3,410,817 | 11/1968 | McClellan et al. | 117—155 X |

WILLIAM D. MARTIN, Primary Examiner

M. R. LUSIGNAN, Assistant Examiner

U.S. Cl. X.R.

162—164